(12) United States Patent
Daude et al.

(10) Patent No.: US 7,231,660 B1
(45) Date of Patent: Jun. 12, 2007

(54) METHOD AND SYSTEM FOR PREVENTING UNAUTHORIZED SERVER INTERFERENCE IN AN INTERNET PROTOCOL NETWORK

(75) Inventors: Olivier Daude, Nice (FR); Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 1550 days.

(21) Appl. No.: 09/696,518

(22) Filed: Oct. 25, 2000

(30) Foreign Application Priority Data

Nov. 25, 1999 (EP) ................................. 99480119

(51) Int. Cl.
*G06F 7/04* (2006.01)
*G06F 15/177* (2006.01)

(52) U.S. Cl. ......................................... 726/4; 709/220

(58) Field of Classification Search ................ 713/2, 713/172, 20, 201; 714/43; 711/110; 717/178; 707/10; 370/392, 401; 709/206, 224, 225, 709/227, 229, 245; 726/4
See application file for complete search history.

(56) References Cited

U.S. PATENT DOCUMENTS 5,812,780 A * 9/1998 Chen et al. ................. 709/224
5,884,024 A * 3/1999 Lim et al. ................... 713/201
6,189,102 B1 * 2/2001 Beser ......................... 713/201
6,304,969 B1 * 10/2001 Wasserman et al. ......... 713/172
6,393,484 B1 * 5/2002 Massarani ................... 709/227
6,424,654 B1 * 7/2002 Daizo ......................... 370/401
6,427,170 B1 * 7/2002 Sitaraman et al. .......... 709/226
6,466,986 B1 * 10/2002 Sawyer et al. .............. 709/245
6,654,914 B1 * 11/2003 Kaffine et al. ................ 714/43
6,678,732 B1 * 1/2004 Mouko et al. .............. 709/227

OTHER PUBLICATIONS

R. Droms et al. Authentication for DHCP Messages. Aug. 1998. IETF: Internet Draft. p. 1-13.*

* cited by examiner

*Primary Examiner*—Ayaz Sheikh
*Assistant Examiner*—Christian LaForgia
(74) *Attorney, Agent, or Firm*—John R. Pivnichny; Dillon & Yudell LLP (57) ABSTRACT

A method and system for preventing unauthorized dynamic host configuration servers from responding to client configuration requests in an Internet Protocol (IP) network. In accordance with the method of the present invention multiple network clients are simulated within a server checker client. At least one unauthorized dynamic host configuration server is then detected utilizing the server checker client within said IP network. Upon detection of an unauthorized dynamic host configuration server, configuration requests are delivered from the server checker client to the detected unauthorized dynamic configuration server such that the unauthorized dynamic host configuration server is unable to respond to configuration requests from actual network clients.

21 Claims, 4 Drawing Sheets

METHOD AND SYSTEM FOR PREVENTING UNAUTHORIZED SERVER INTERFERENCE IN AN INTERNET PROTOCOL NETWORK

BACKGROUND OF THE INVENTION

1. Technical Field

The present invention relates to computer networks, and in particular to a method and system in an Internet Protocol (IP) network for detecting and neutralizing one or a plurality of unauthorized Dynamic Host Configuration Protocol (DHCP) servers.

2. Description of the Related Art

Internet

The Internet is a global network of computers and computers networks (the "Net"). The Internet connects computers that use a variety of different operating systems of languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet.

(1) transmitting and receiving electronic mail,
(2) logging into remote computers (the "Telnet"), and
(3) transferring files and programs from one computer to another ("FTP" or "File Transfer Protocol").

IP Addresses

Routers are utilized to interconnect two networks by forwarding packets from one network to the other. The term "IP router" is also used because the routing function is part of the IP network layer of the TCP/IP protocol.

IP addresses are utilized by the IP protocol to uniquely identify a host on the Internet. Strictly speaking, an IP address identifies an interface that is capable of sending and receiving IP datagrams, and one system can have more than one of such interfaces. However, both hosts and routers must have at least one IP address, so this simplified definition is acceptable. IP datagrams (data packets exchanged between hosts) are transmitted by a physical network attached to the host, wherein each IP datagram contains a source IP address and a destination IP address.

IP addresses are represented by a 32-bit unsigned binary value which is usually expressed in a dotted decimal format. For example, 9.167.5.8 is a valid Internet address. This numeric form is utilized by the IP software. The mapping between the IP address and an easier-to-read symbolic name, for example myhost.ibm.com, is performed by a Domain Name System (DNS).

IP Subnets

Due to the explosive growth of the Internet, assigning IP addresses is not flexible enough to allow efficiently facilitate changes in local network configurations. Such changes might occur when a new type of physical network is installed at a location. A growing number of hosts within a local network may also precipitate such configuration changes by requiring that the local network split into two or more separate networks. In addition, growing intranetwork distances require to divide a network into smaller networks separated by gateways.

The concept of subnets has been introduced to avoid the need to request additional IP network addresses in these cases. Subnets can be assigned locally, since the original single network still appears as one IP network with respect to the larger IP internetwork context. To designate a subnet, the host number within an IP address header is subdivided into a network number and a host number. This second network is termed "subnetwork" or "subnet". The original network now includes multiple subnets, and an IP address associated therewith is interpreted as:

<network number><subnet number><host number>.

The combination of the subnet number and the host number is often termed "local address" or "local part". Subnetting is implemented in such a way that it is transparent with respect to remote networks. A host within a network that includes subnets is aware of the subnetting while hosts in outside networks are not (the local hose still regards the local part of the IP address as a host number).

The manner in which the local part of the IP address is divided into subnet number and host number is freely chosen by the local network administrator (i.e., any bits in the local part of the address can be utilized to designate a subnet). The division of the original local part of the IP address into a subnet and host name is performed utilizing a subnet mask which is a 32-bit number. Zero bits in a subnet mask indicate bit positions ascribed to the host number, and ones indicate bit positions ascribed to the subnet number. The bit positions in the subnet mask belonging to the network number are set to ones but are not utilized. Subnet masks, like IP addresses are usually written in dotted decimal form.

World Wide Web

With the increasing size and complexity of the Internet, tools that are often called navigators or navigation systems have been developed to help find information on the network. Navigation systems include standards such as Archie, Gopher and, most well-known, the World Wide Web ("WWW" or "the Web"). In addition to serving as an Internet-based navigation system, the Web is also an information distribution and management system for the Internet. The Web provides an end user with a seamlessly integrated format of information, including still images, text, audio and video. A user on the Web using a graphical user interface may transparently communicate with different host computers on the system, different system applications, and different information formats for files and documents including text, sound, and graphics.

Uniform Resource Locators

A resource of the Internet is unambiguously identified by a Uniform Resource Locator (URL), which is a pointer to a particular resource at a particular location. A URL specifies the protocol utilized to access a server (e.g. HTTP, FTP, . . . ), the name of the server, and the location of a file on that server.

Hyper Text Transfer Protocol

Each Web page that appears on client monitors may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web servers utilize a Hyper Text Transfer Protocol (HTTP) to communicate with Web clients. All types of data can be exchanged among Web servers and clients using HTTP, including Hyper Text Markup Language (HTML), graphics, sound and video, HTML describes the layout, contents and hyperlinks of the documents and pages. When browsing, a Web client converts user specified commands into HTTP GET requests, connects to the appropriate Web server to retrieve information, and waits for a response. The response from the server can be the requested document or an error message. After the document or an error message is returned, the connection between the Web client and the Web server is closed.

HTTP version 1.0 is a stateless protocol in which there is no continuous connection between each client and each server. A Web client using HTTP receives a response as HTML data or other data. The new HTTP version 1.1 breaks this barrier of stateless protocol by keeping the connection between the server and client alive under certain conditions.

Domain Names

The host or computer names (like www.entreprise.com) are translated into numeric Internet addresses (like 194.56.78.3), and vice versa, by using a method called DNS ("Domain Name Service"). DNS is supported by network-resident servers, also known as domain name servers or DNS servers.

Dynamic IP

For dynamic IP there are generally three pieces of information needed by a system to communicate on a TCP/IP network. First, there is an IP address utilized to uniquely identify a particular system on the network. Next, a subnet mask is utilized to distinguish the network and subnet parts of the address. Finally, an address of at least one router is required if the system communicates with devices outside its immediate subnet.

While at a minimum these three values must be programmed into each device that participates in TCP/IP communications, the number of necessary parameters will often be much higher. Given the exponential growth rate of modern networks, the task of manually programming these values into every device attached to the network represents a major administrative workload.

The increasingly mobile nature of the end users also raises problems with regard to configuration of network devices. Allocating multiple sets of configuration parameters to a device requires an even greater workload for the network administrator. Multi-configuration allocation is also wasteful in terms of the sheer number of IP addresses allocated.

As explained next, several components of TCP/IP can automate device configuration, reduce the number of IP addresses allocated, and/or cope with the demands of mobile user.

Bootstrap Protocol (BOOTP)

The BOOTP protocol was originally developed as a mechanism to enable diskless hosts to be remotely booted over a network as workstations, routers, terminal concentrators, etc. Implementing BOOTP allows a minimal IP protocol stack with no configuration information required for obtaining sufficient information to begin the process of downloading the necessary boot code. While BOOTP does not define the manner in which the downloading is performed, TFTP "Trivial FIle Transfer Protocol (TFTP)" as described in *RFC 906—Bootstrap Loading Using TFTP* is generally utilized. Although BOOTP is still widely utilized for remote booting of diskless hosts, itvis also commonly utilized as a mechanism that delivers configuration information to a client that has not been manually configured.

The latter BOOTP process involves the following steps. First, a BOOTP client determines its own hardware address, normally from a ROM (Read Only Memory) on the hardware. Next the client sends its hardware address in a UDP (User Datagram Protocol) datagram to the server. The client should utilized its IP address and/or the address of the server if it has these values. However, BOOTP clients generally have no IP configuration data at all. If the client does not know its own IP address, it utilizes 0.0.0.0. If the client does not know the server's IP address, it utilizes the limited broadcast address (255.255.255.255) on the server's UDP port number 67.

After the server receives the datagram, it performs a lookup to identify the hardware address of the client in its configuration file. The hardware address contains the client's IP address. The server then supplies the required address information in the appropriate UDP datagram fields, and returns the dataframe to the client using client's UDP port 68. Upon receiving the reply, the BOOTP client will record its own IP address and begin the bootstrap process.

BOOTP is a recommended draft standard protocol, BOOTP specifications can be found in *RFC 951—Bootstrap Protocol*. There are also updates to BOOTP, some relating to inter operability with DHCP (Dynamic Host Configuration Protocol) that are described in *RFC 1542—Clarifications and Extensions for the Bootstrap Protocol*, which updates RFC 951 and *RFC 2132—DHCP Options and BOOTP Vendor Extensions*.

Dynamic Host Configuration Protocol (DHCP)

Dynamic Host Configuration Protocol (DHCP) provides a framework for passing configuration information to hosts on a TCP/IP network. DHCP is based on the BOOTP protocol, and adds the capability of automatically allocating reusable network addresses and additional configuration options. DHCP messages utilize UDP port 67, the BOOTP server's well-known port, and UDP port 68, the BOOTP client's well-known port.

DHCP consists of two components including a protocol that delivers host-specific configuration parameters from a DHCP Server to a host, and a mechanism for the allocation of temporary or permanent network addresses to hosts.

IP requires the setting of many parameters within the protocol implementation software. Because IP can be utilized on many dissimilar types of network hardware, values for those parameters cannot be presumed. A distributed address allocation scheme based on a polling/defence mechanism, for discovering network addresses currently in use, cannot guarantee unique network addresses because hosts may not always be able to protect their network addresses.

DHCP supports three mechanisms for IP address allocation. First DHCP supports automatic allocation in which DHCP assigns a permanent IP address to the host. Second, DHCP supports dynamic allocation in which DHCP assigns an IP address for a limited period of time. Finally, DHCP supports manual allocation in which the host's address is assigned by a network administrator.

DHCP is a draft standard protocol having an elective status. The current DHCP specifications can be found in *RFC 2131—Dynamic Host Configuration Protocol and RFC 2132—DHCP Options and BOOTP Vendor Extensions*.

Configuration Parameters Repository

DHCP provides persistent storage of network parameters for network clients. A DHCP server stores a key-value entry for each client. The key is a unique identifier such as, for example, an IP subnet number and a unique identifier within the subnet (normally a hardware address). The key-value contains the configuration parameters last allocated to this particular client.

One effect of this persistent key-value storage is that the server will always tend to allocate the same IP address to a DHCP client, provided the pool of addresses is not oversubscribed and the previous address has not already been allocated to another client.

DHCP Considerations

DHCP allocation of IP addresses and configuration parameters relieves the network administrator of a great deal of manual configuration work. The ability to move a device from network-to-network and to automatically obtain valid configuration parameters for the current network can be of great benefit to mobile users. Also, because IP addresses are only allocated when clients are actually active, it is possible, by the use of reasonably short lease times and the fact that mobile clients do not need to be allocated more than one address, to reduce the total number of addresses in use in an organization.

However, the following should be considered when implementing DHCP. First, DHCP is built on UDP, which is, as yet, inherently insecure. In normal operation, an unauthorized client could connect to a network and obtain a valid IP address and configuration. To prevent this, IP addresses can be preallocated to particular MAC (Medium Access Control) addresses. This solution, however introduces additional administrative workload and negates the benefit of recycling addresses. Another problem with DHCP is the possibility that unauthorized DHCP servers may be implemented which send false and potentially disruptive information to clients.

Regardless of whether static or dynamic address allocation is utilized, it is generally not possible in a DHCP environment to predetermine the IP address of a client at any particular point in time. As such, the DNS servers will not likely contain valid host-name-to-IP-address mappings for the clients. The only alternative is to manually assign IP addresses to clients and then administer the client mappings in the DNS accordingly.

BOOTP and DHCP Interoperability

The format of DHCP messages is based on the format of BOOTP messages, thus enabling BOOTP and DHCP clients to interoperate in certain circumstances. Support for BOOTP clients at a DHCP server must be configured by a system administrator.

Dynamic Domain Name System

In order to take advantage of DHCP, while retaining the capability to locate any specific host by means of a meaningful label such as its host name, the following extensions to the DNS are required. First, a method is required for the host name to be addressed to a mapped entry for a client in the domain name server to be updated, once the client has obtained an address from a DHCP server. A method is required for the reverse address to host name mapping once the client obtains its address.

In addition, updates to the DNS must take effect immediately, without the need for intervention by an administrator. Updates to the DNS must be authenticated to prevent unauthorized hosts from accessing the network and to stop imposters from using an existing host name and remapping the address entry for the unsuspecting host to that of its own. Finally, a method is required which allows primary and secondary DNS servers to quickly forward and receive changes as entries are being updated dynamically by clients. In short, a secure Dynamic Domain Name System (DDNS), is necessary.

In summary, in the DHCP and DDNS environment, DHCP supplies a valid IP address to a device at the point in time at which the device is attached to the network. DDNS provides a method for locating that device within the network in accordance with its host name, and for determining the IP address allocated to the device.

More explanations about the domain presented in the above sections can be found in the following publications incorporated herewith by reference. TCP/IP Tutorial and Technical Overview by Martin W. Murhammer, Orcun Atakan, Stefan Bretz, Larry R. Pugh, Kazunari Suzuki, David H. Wood published by IBM International Technical Support Organization, "Internet in a nutshell" by Valerie Quercia, published by O'Reilly, October 1997; Request For Comments (RFCs) from the Internet Engineering Task Force (IETF); and RFC 2131: Dynamic Host Configuration Protocol.

When a DHCP client needs to acquire configuration information such as an IP address (for instance when the DHCP client is powered on), the DHCP client usually broadcasts a request to retrieve the configuration information from a DHCP server. The DHCP service is provided by one or more DHCP servers, in order to optimally adjust configuration parameters. Due to the nature of the DHCP protocol which is based on UDP (User Datagram Protocol) BOOTP broadcast, any DHCP server attached to the IP network can answer requests from DHCP clients and can therefore provide DHCP clients with configuration parameters. The DHCP client selects and utilizes the configuration parameters included within one of the answers received from the DHCP servers (usually, the DHCP client selects and utilizes the configuration parameters received from the first DHCP server to respond).

Once a DHCP client has retrieved the requested configuration information (including its IP address) from a DHCP server, the DHCP client can then utilize the configuration information to access resources within the IP network. For example, a DHCP client utilizes its IP address to access a WEB server within the IP network.

Some access and security considerations are associated with the configuration information retrieved by DHCP clients. For example, the IP address retrieved and utilized by a DHCP client may be utilized by a WEB server to identify the DHCP client. The WEB server can then only respond to requests from the DHCP client having this specific IP address. The DHCP client configured with the specific IP address is therefore able to retrieve information from the WEB server (for example confidential information). A DHCP client configured with an IP address different from the specific IP address is not able to retrieve confidential information from the WEB server.

The nature of the configuration information provided by the DHCP servers may be determined by a network administrator. Erroneous configuration information may result in DHCP clients having problems accessing resources within the IP network. For example, a WEB server may only accept requests sent by DHCP clients that have valid IP addresses (an IP address included within a list of IP addresses controlled by the network administrator). If the IP address retrieved from a DHCP server by a DHCP client is incorrect (an IP address which is not included within the list of valid IP addresses), the WEB server will reject requests originated from the DHCP client.

Inversely, an incorrect IP address provided to a DHCP client may enable the DHCP client to access a WEB server that the client should not have access to. A security problem is thus presented because the DHCP client may access confidential information it is not supposed to access.

DHCP servers that provide DHCP clients with erroneous configuration information are called "unauthorized DHCP servers", or "invalid DHCP servers", because they are not properly under the control of a network administrator. Unauthorized DHCP servers may be unintentionally attached to an IP network for example by someone testing DHCP functions, or may be deliberately attached to create access problems within the IP network.

From the foregoing, it can be appreciated that there exists a need to detect any unauthorized DHCP server attached to the IP Network. Furthermore it would be useful to inhibit any unauthorized DHCP server attached to the IP network from providing unauthorized access to IP network resources.

SUMMARY OF THE INVENTION

A method and system for preventing unauthorized dynamic host configuration servers from responding to client configuration requests in an Internet Protocol (IP) network are disclosed herein. In accordance with the method of the present invention multiple network clients are simulated within a server checker client. At least one unauthorized dynamic host configuration server is then detected utilizing the server checker client within said IP network. Upon detection of an unauthorized dynamic host configuration server, configuration requests are delivered from the server checker client to the detected unauthorized dynamic configuration server such that the unauthorized dynamic host configuration server is unable to respond to configuration requests from actual network clients.

All objects, features, and advantages of the present invention will become apparent in the following detailed written description.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENT

IP Address Allocation

Figure 1:
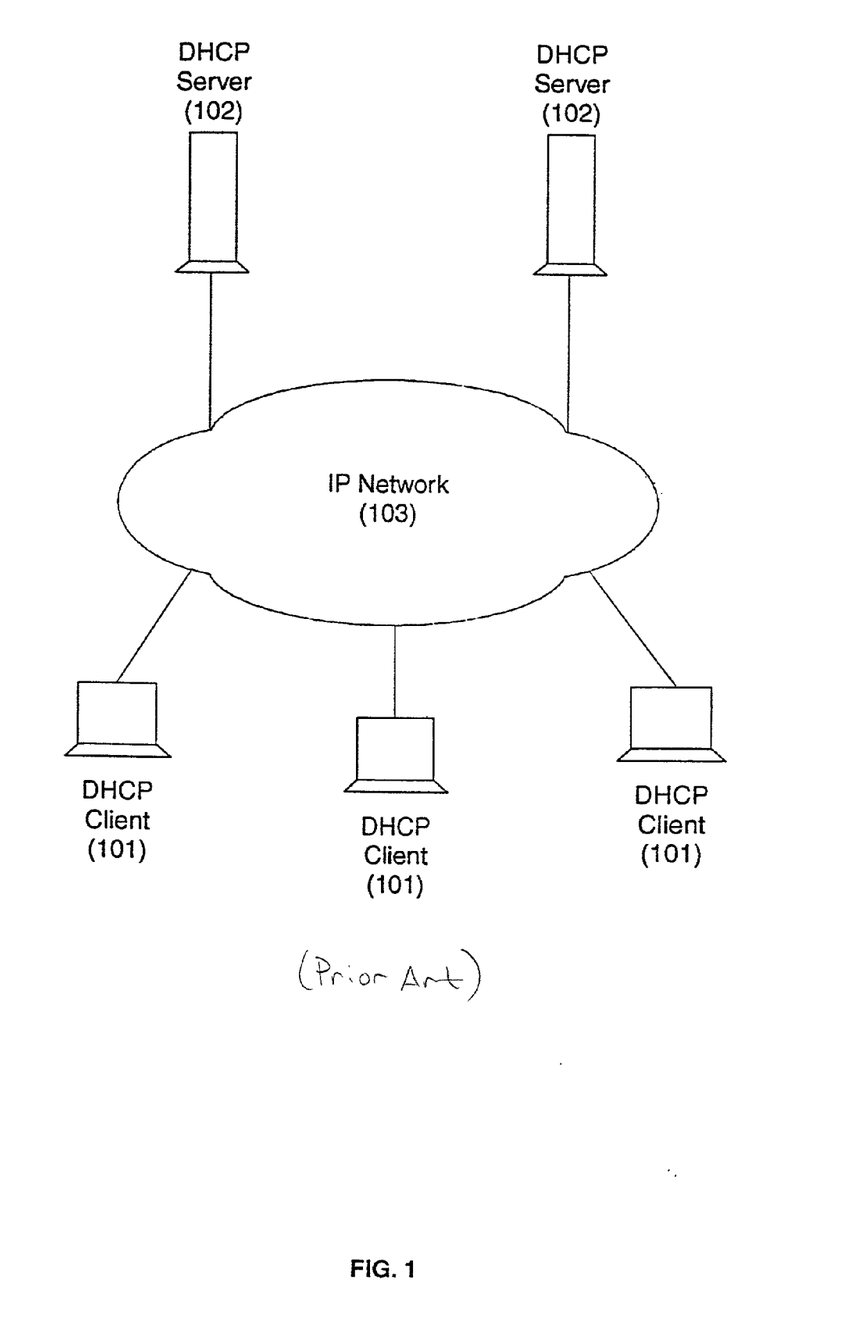
FIG. 1 illustrates a conventional IP host configuration system.

With reference now to the figures, and in particular with reference to FIG. 1 there is illustrated a conventional IP host configuration system ni which DHCP client/server interactions are described in the context in which the DHCP client is not aware of its network address. More particularly, FIG. 1 shows the acquisition mechanism by which a DHCP client acquires an IP address and the IP minimal configuration parameters provided by a DHCP server within an IP network.

A DHCP client 101 broadcasts a request on its local physical subnet 103. The request is forwarded by any router having a BOOTP forwarding mechanism. When the request is received by a DHCP server 102, the DHCP server checks whether or not it is able to answer the DHCP client. If the DHCP server has an available IP address within its address database, a positive answer is returned to DHCP client 101. DHCP client 101 selects the first DHCP server for which a positive answer is received and confirms to this server its agreement.

Specifically, the allocation of a new network address as described above includes the following steps. First, DHCP client 101 broadcasts a request (a DHCPDISCOVER message) on its local physical subnet 103. The request may include desired options such as network address suggestion or lease duration.

Each DHCP server may respond with a message (a DHCPOFFER message) that includes an available network address and other configuration options. The DHCP server may record the address as offered to DHCP client 101 to prevent the same address being offered to other DHCP clients in the event of further messages being received before the first DHCP client has completed its configuration.

DHCP client 101 receives one or more messages from one or more of DHCP servers 102. DHCP client 101 chooses one response based on the configuration parameters offered and broadcasts a message (a DHCPREQUEST message) that includes the DHCP server identifier option to indicate which message it has selected and the requested IP address option, taken from the DHCP client IP address in the selected offer.

DHCP servers 102 receive the messages broadcasted by DHCP client 101. Those DHCP servers not selected utilize the message as notification that the DHCP client has declined that DHCP server's offer. The selected DHCP server commits the binding for the DHCP client to persistent storage and responds with a message containing the configuration parameters for the requesting DHCP client. The DHCP client receives the message with configuration parameters and performs a final check on the parameters. At this point the DHCP client is configured.

DHCP Checker Client

Figure 2:
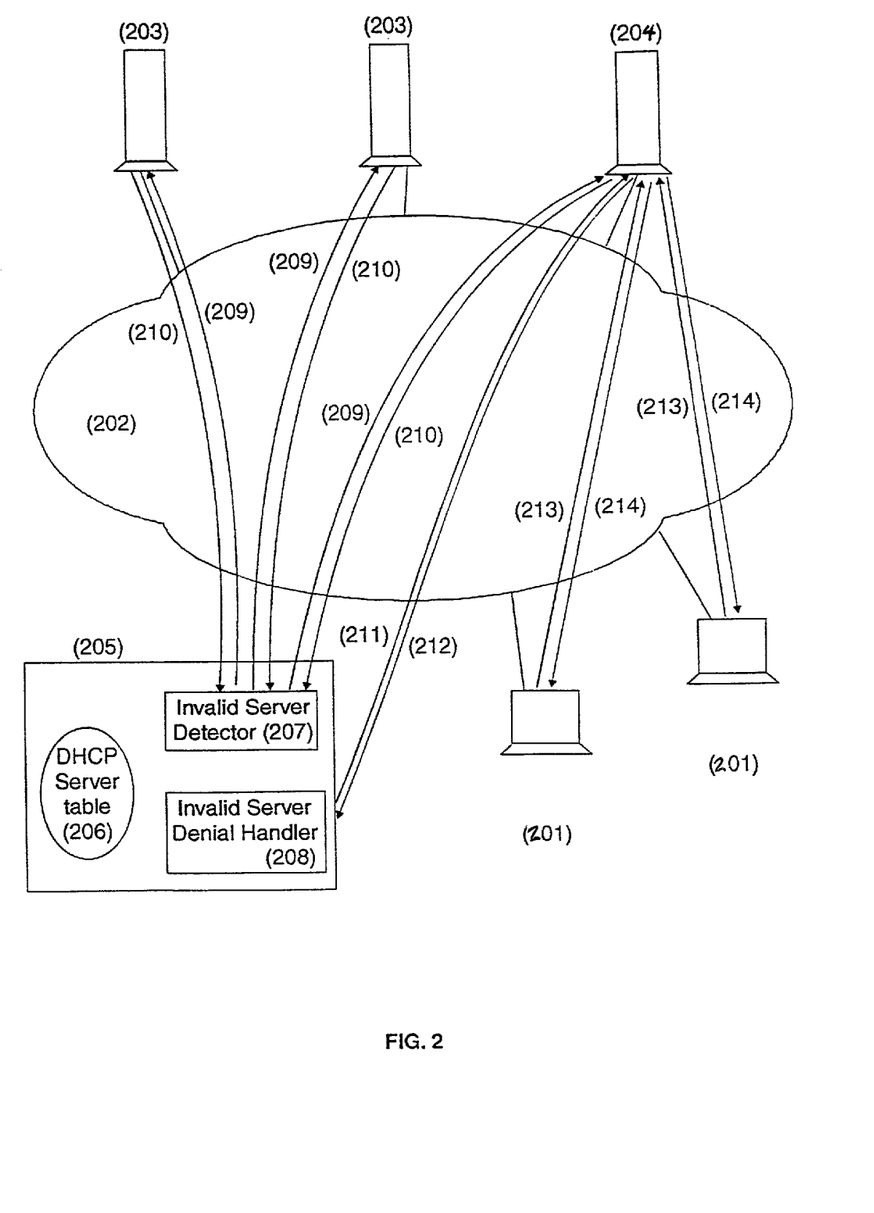
FIG. 2 depicts a DHCP checker client in accordance with a preferred embodiment of the present invention.

The present invention relates to a system and method for detecting and neutralizing unauthorized DHCP servers attached to an IP network. FIG. 2 depicts a system that is utilized for detecting and neutralizing unauthorized DHCP servers according to the present invention.

DHCP clients 201 on an IP network 202 retrieve their configuration information from DHCP servers 203 and 204 attached to the IP network. DHCP servers 203 are authorized DHCP servers that are controlled by a network administrator. Authorized DHCP servers 203 provide valid configuration information to the DHCP clients 201.

One or more DHCP servers 204, that are also attached to IP network 202, are unauthorized DHCP servers (also referred to as an invalid DHCP server). They are not controlled by a network administrator and they provide invalid configuration information to the DHCP clients 201. Such unauthorized DHCP servers may be unintentionally attached to IP network 202 by someone testing DHCP functions, or may be intentionally attached to sabotage IP network 202.

As further illustrated in FIG. 2, a DHCP checker client 205 is also attached to IP network 202 in accordance with the preferred embodiment of the present invention. DHCP checker client 205 is preferably a computer program that can run on any system (a workstation, for example) attached to IP network 202. DHCP checker client 205 carries out the method for detecting and neutralizing one (or multiple) unauthorized DHCP server 204.

DHCP checker client 205 includes a DHCP server table 206. DHCP server table 206 (a flat file in a preferred embodiment) may be created by the network administrator responsible for the IP network. DHCP server table 206 includes a list of authorized DHCP servers. Each authorized DHCP server 203 is preferably identified within DHCP server table 206 in accordance with its respective IP address.

When DHCP checker client 205 is started, an invalid server detector component 207 periodically sends requests 209 to retrieve configuration information 210 from DHCP servers 203 and 204. Invalid server detector 207 detects one or more unauthorized DHCP servers 204 by comparing a "server identifier" option included in the DHCPOFFER message returned by the DHCP servers in configuration information 210 with authorized server identification data in DHCP server table 206.

In response to one or more unauthorized DHCP servers 204 being detected by invalid server detector 207, DHCP checker client 205 automatically activates an invalid server denial handler component 208. Invalid server denial handler 208 simulates multiple DHCP clients by sending a large number of requests 211 to each unauthorized DHCP server 204 detected by invalid server detector 207, for retrieving 212 configuration information. The requests 211 include DHCPDISCOVER and DHCPREQUEST unicast messages, and utilizes 'gladdr', 'chaddr', and 'ciaddr' fields of the messages. The number of the requests depends on the configuration of the DHCP checker client.

By simulating multiple DHCP clients, invalid server denial handler 208 prevents unauthorized DHCP servers 204 from answering actual DHCP clients 201 that request configuration information. As a result, the number of DHCP clients 201 receiving erroneous configuration information by the unauthorized DHCP servers 204 is minimized. Additionally, access problems caused by the unauthorized DHCP servers are also minimized.

Unauthorized DHCP servers are, in effect, neutralized in response to invalid server denial handler 208 sending a large number of requests 211 to each unauthorized DHCP server 204. This neutralization results from each unauthorized DHCP server 204 being overloaded with the requests and the corresponding configuration responses 212. In response to configuration requests and the resulting responses 212, many if not all of the IP addresses allocatable by unauthorized DHCP server 204 are reserved for DHCP checker client 205 and are therefore no longer available for other DHCP clients 201.

After such neutralization, each is too busy to answer 214 requests 213 that are sent by DHCP clients 201. Unauthorized DHCP server 204 is depleted of the available IP addresses which can be provided to DHCP clients 201. The number of DHCP clients 201 that may potentially retrieve 214 configuration information from unauthorized DHCP servers 204 is therefore minimized.

Invalid Server Detector

Invalid server detector 207 is preferably a computer program that periodically requests and retrieves configuration information from DHCP servers 203 and 204. Invalid server detector 207 identifies unauthorized DHCP servers 204 by comparing server identification data in DHCP server table 206 with the "server identifier" option included in the DHCPOFFER message returned 210 by the DHCP servers.

Figure 3:
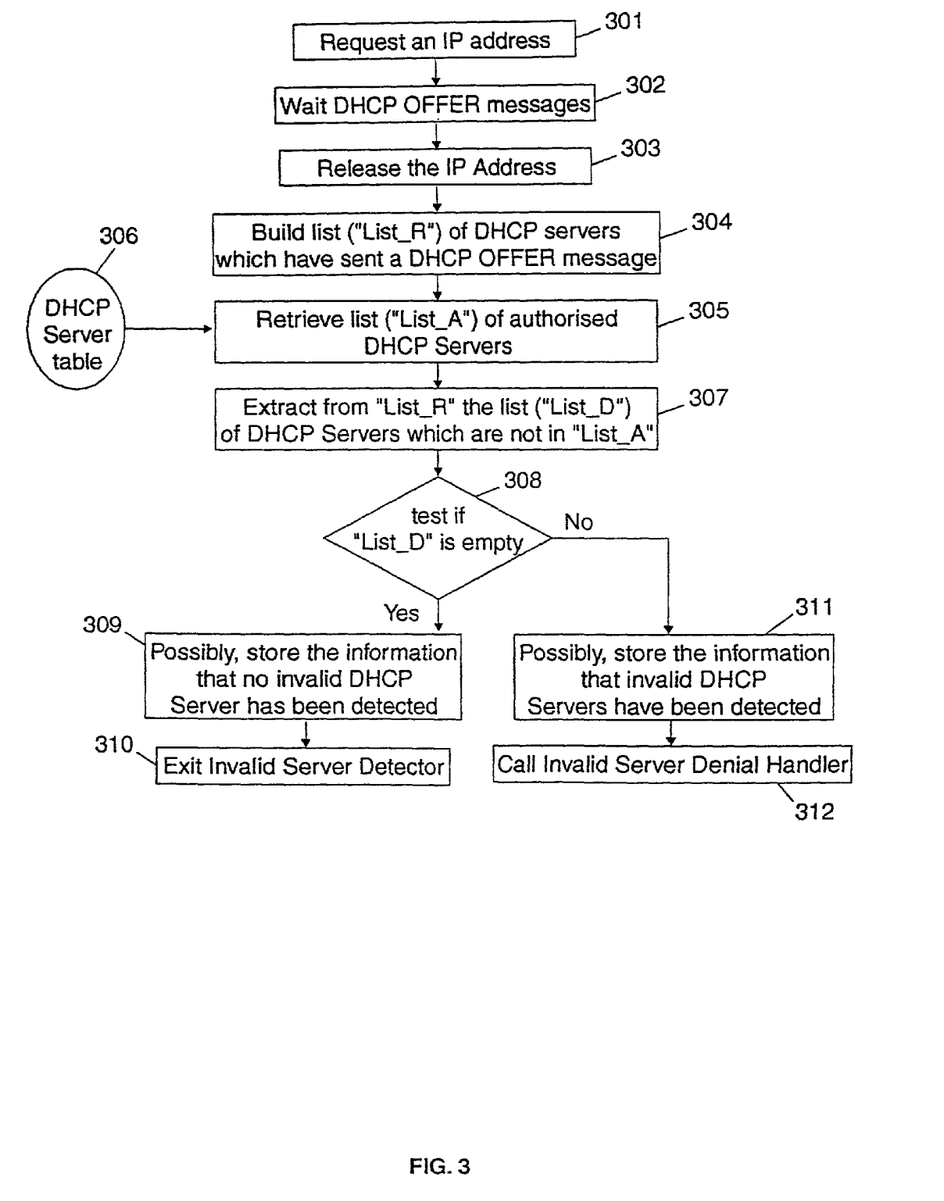
FIG. 3 is a flow diagram view illustrating the logic flow of an invalid server detector in accordance with a preferred embodiment of the present invention.

Invalid server detector 207 is activated when the DHCP checker client starts. With reference now to FIG. 3, there is depicted a flow diagram illustrating the logic flow of invalid server detector 207 for detecting invalid DHCP servers in accordance with a preferred embodiment of the present invention.

As depicted at step 301, the invalid server detection process begins with invalid server detector 207 requesting an IP address. During step 301, DHCP checker client 205 appears as a typical DHCP client within respect to DHCP servers 203 and 204. Invalid server detector 207 sends a DHCPDISCOVER message on the IP network, in order to request configuration parameters (including an IP address) from a DHCP server. The DHCPDISCOVER message is a broadcast message which is sent to any system attached to the IP network.

Next, as shown at step 302, invalid server detector 207 waits for DHCPOFFER messages. Each of DHCP servers 203 and 204 that satisfy the DHCPDISCOVER request sent by invalid server detector 207, responds to the request with a DHCPOFFER message. The DHCPOFFER message includes the configuration information (including the IP address) proposed by the responding DHCP server. In addition the DHCPOFFER message includes the 'server identifier' option. The 'server identifier' option includes the address (the IP address) of the respondent DHCP server. The time over which invalid server detector 207 waits before receiving the DHCPOFFER message sent by each DHCP server is preferably a configuration parameter of DHCP checker client 205.

Proceeding to step 303, invalid server detector 207 releases the IP address proposed by each DHCP server. Authorized DHCP servers 203 may have sent a DHCPOFFER to propose configuration parameters. Invalid server detector 207 therefore releases the proposed configuration parameters so that they can be utilized by actual DHCP clients 201. In order to release the IP address proposed by each DHCP server, invalid server detector 207 sends a DHCPREQUEST broadcast message that includes a 'server identifier' option. The 'server identifier' option is not set by invalid server detector 207 with the identifier of the DHCP server that has been selected, but instead includes the identifier (the IP address) of a DHCP server that does not exist (10.1.1.1, for example).

When each DHCP server 203 and 204 receives the DHCPREQUEST message, it compares the IP address included within the 'server identifier' option and its own IP address. Since the 'server identifier' and its IP address are different, the DHCP server marks the proposed configuration parameters as being available again for other DHCP clients.

As illustrated at step 304, invalid server detector 207 builds a list (called "List_R") of the DHCP servers which have sent a DHCPOFFER. The list "List_R" includes the IP address of each DHCP server to which the DHCPOFFER message has been sent. In a preferred embodiment, "List_R" is constructed using the 'server identifier' option included in each DHCPOFFER message received in 202. The IP address of each DHCP server which has sent a DHCPOFFER is extracted from the 'server identifier' option.

Proceeding to step 305, invalid server detector 207 retrieves a list (called "List_A") of all authorized DHCP servers. This list is retrieved from a DHCP server table 306 that is analogous to DHCP server table 206 in FIG. 2. "List_A" includes the IP address of each authorized DHCP server.

Invalid server detector 207 extracts from "List_R" a list (called "List_D") of the DHCP servers which are not in "List_A" as shown at step 307. "List_D" therefore includes the IP address of each unauthorized (also referred to as invalid) DHCP server.

As depicted at step 308, invalid server detector 207 determines whether or not "List_D" is empty. If "List_D" is determined to be empty, no unauthorized (invalid) DHCP server has been detected, and as illustrated at step 309, invalid server detector 207 may store a message indicated that no invalid DHCP server has been detected. This message may be, for example, stored in a file located within the DHCP checker client. The operational cycle for invalid server detector 207 then concludes as shown at step 310. The DHCP checker client then initiates another cycle in which invalid server detector 207 begins the procedure for detecting unauthorized DHCP servers starting at step 301. The inter-cycle period in which DHCP checker client 205 waits before starting invalid server detector 207 is preferably a configuration parameter of DHCP checker client 205.

If, however, as depicted at step 311, it is determined at step 308 that "List_D" is not empty, one or more unauthorized (invalid) DHCP servers have been detected. In such a case, and as illustrated at step 311, invalid server detector 207 may store a message indicating that one or multiple invalid DHCP servers have been detected. This message may includes the IP address of each the detected unauthorized DHCP servers, and is stored in a file located within DHCP checker client 205. An network alert including the unauthorized server message can also be sent to a network administrator. The network administrator can then (for example) disconnect each unauthorized DHCP server from the IP network. Detection of an unauthorized server concludes as shown at step 312, with invalid server detector 207 calling invalid server denial handler 208.

Invalid Server Denial Handler

The invalid server denial handler component of the DHCP checker client is preferably a computer program. This component is responsible for: sending a large number of requests to each unauthorized DHCP server 204; and retrieving 212 configuration information from each unauthorized DHCP server 204 detected by the invalid server detector component. The requests include DHCPDISCOVER and DHCPREQUEST unicast messages, and utilizes the 'giaddr', 'chaddr', and 'claddr' fields of the messages. The number of the requests delivered from invalid server denial handler is a configuration parameter of the DHCP checker client.

The invalid server denial handler, such as invalid server denial handler 208, simulates multiple DHCP clients to achieve the following goals. First, the client simulation prevents, to the extent possible, unauthorized DHCP servers 204 from responding the DHCP clients 201 that request configuration information. Client simulation further minimizes the number of DHCP clients 201 to which erroneous configuration information is provided by unauthorized DHCP servers 204 which in turn minimizes network access problems cause by the unauthorized DHCP servers.

These goals are achieved by sending a large number of requests 211 to each unauthorized DHCP server 204, in order to overload each unauthorized DHCP server with the requests and the corresponding answers 212 and to reserve many if not all of the IP addresses allocatable by the unauthorized servers for the DHCP checker client. These reserved IP addresses are therefore no longer available for actual DHCP clients 201.

As a consequence of client simulation operations performed by invalid server denial handler 208, each the unauthorized DHCP server 204 is too busy to answer 214 requests sent 213 by actual DHCP clients 201. The unauthorized servers are thus depleted of available IP addresses that can be provided to actual DHCP clients 201. In this manner, the number of DHCP clients that retrieve 214 configuration information from the unauthorized DHCP servers is minimized.

Figure 4:
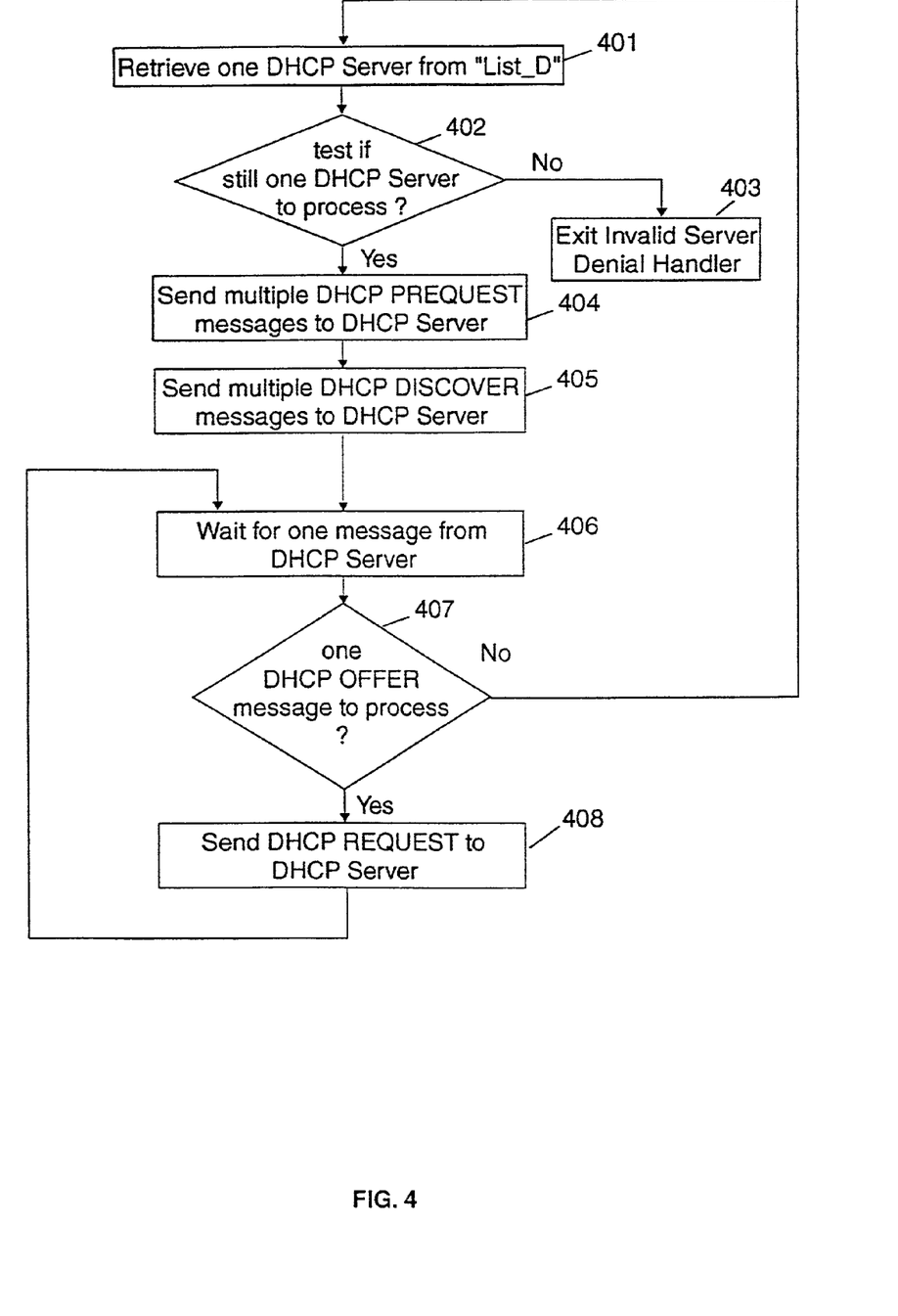
FIG. 4 is a flow diagram view depicting the logic flow of an invalid server denial handler in accordance with a preferred embodiment of the present invention.

Invalid server denial handler 208 is called by invalid server detector 207 when one or multiple unauthorized (invalid) DHCP servers have been detected. With reference now to FIG. 4, there is illustrated a flow diagram depicting the logic flow of invalid server denial handler 208 in accordance with a preferred embodiment of the present invention.

The operation of invalid server denial handler 208 begins as depicted at step 401, with invalid server denial handler 208 retrieving the identity of one DHCP server from "List_D". As previously explained with reference to FIG. 3, "List_D" includes the IP address of each unauthorized (invalid) DHCP server ("List_D" is built by the invalid server detector).

After retrieving the identity of the unauthorized server at step 401, invalid server denial handler 208 determines if there is still at least one unauthorized DHCP server to process as shown at step 402. If there is no DHCP server to process, all unauthorized DHCP servers detected by invalid server detector 207 have been processed by invalid server denial handler 208 and as illustrated at step 403, client simulation operations of invalid server denial handler 208 are paused. DHCP checker client 205 periodically initiates unauthorized server detection cycles performed by invalid server detector 207. The inter-cycle period between such cycles is preferably a configuration parameter of DHCP checker client 205.

If, as determined at step 402, there remains at least one unauthorized DHCP server to process, then as illustrated at step 404, invalid server denial handler 208 sends multiple DHCPREQUEST messages to the next unprocessed DHCP server. Invalid server denial handler sends a large number of DHCPREQUEST messages to the specified DHCP server. The number of requests delivered is preferably a configuration parameter of DHCP checker client 205. Each the DHCPREQUEST message sent at step 404 has the following characteristics. Each message is a unicast message having as its destination the specified unauthorized DHCP server. Since the message is a unicast message, the traffic within the IP network is minimized, and the impact of the traffic on the devices attached to the IP network is minimized (as compared to a broadcast message sent to all devices attached to the IP network). For example, the DHCP clients attached to the IP network do not have to waste time reading the unicast message (as opposed to a broadcast message, where each DHCP client has to read the broadcast message just to determine that it does not have to answer it).

A 'claddr' field included in each the DHCPREQUEST is set by invalid server denial handler 208 with an IP address that is not included within the range of the valid addresses utilized within the IP network. The range of valid IP addresses may be, for example, a configuration information of DHCP checker client 205, as provided by a network administrator. Since the DHCPREQUEST request received by the DHCP server includes an invalid (and therefore unknown) IP address in the 'claddr" field, a somewhat extended period of time will be required by the DHCP server before it determines that it cannot satisfy the request. During this time period, the DHCP server is busy and therefore is usually not able to respond to all the requests sent 213 by actual DHCP clients 201.

Proceeding to step 405, invalid server denial handler 208 sends multiple (preferably many) DHCPDISCOVER messages to the unauthorized DHCP server. The number of such discover messages sent by invalid server denial handler 208 is preferably a configuration parameter of DHCP checker client 205 (50 messages, for example). Each DHCPDISCOVER message has the following characteristics. First, in a preferred embodiment of the present invention, each message is a unicast message having the unauthorized server as its destination. Since each message is an unicast message, the traffic impact of the messages within the IP network is minimized (as compared to a broadcast message that is sent to all devices attached to the IP network). For example, the DHCP clients attached to the IP network do not have to waste time reading the unicast message (as opposed to a broadcast message, where each DHCP client has to read the broadcast message just to determine that it does not have to answer it).

A 'chaddr' field included in each DHCPDISCOVER is set by invalid server denial handler 208 with a MAC address which is not included within a range of valid MAC addresses utilized within the IP network. The MAC address is therefore unknown within the IP network. The range of valid MAC addresses may be, for example, a configuration information of the DHCP checker client provided by a network administrator. This MAC address is selected such that it is not already utilized for another DHCPDISCOVER previously sent by the invalid server denial handler.

Since the DHCP server receives a DHCPDISCOVER request including a new unknown MAC address in the 'chaddr" field, the DHCP server reserves a new IP address for the MAC address. The IP address is reserved by the unauthorized server for the DHCP checker client 205, and is therefore no longer available for other DHCP clients 201 which may request 213 configuration parameters from the unauthorized DHCP server.

The DHCP server reserves one IP address for the DHCP checker client, for each DHCPDISCOVER message. Since a large number of DHCPDISCOVER messages are received by the DHCP server, the DHCP server finally runs out of the available IP addresses that can be provided to DHCP clients 201.

A 'gladdr' field included in each DHCPDISCOVER message is set by invalid server denial handler 208 with the IP address of DHCP checker client 205. The DHCP server therefore delivers its response to the request with a DHCPOFFER message to the IP address of DHCP checker client 205.

Optionally, the DHCPDISCOVER request also includes an "IP address lease time" option that is set to request a very long lease time (one week, for example) or even an infinite lease time. In such a case, the DHCP server reserves the IP address of DHCP checker client 205 for a very long associated with the MAC address included in the 'chaddr' field of the DHCPDISCOVER request. During the period in which the IP address is reserved, the DHCP server is not able to provide the IP address to the actual DHCP clients 201.

Next, as depicted at step 406, invalid server denial handler 208 waits for a message from the DHCP server. The message may be, for example, a DHCPOFFER message in response to a DHCPDISCOVER request. The period of time over which invalid server denial handler 208 waits before receiving the messages is preferably a configuration parameter of DHCP checker client 205.

Invalid server denial handler 208 then determines whether or not there is a DHCPOFFER message available for processing as shown at step 407. The DHCPOFFER message includes the configuration information proposed by the DHCP server (including the proposed IP address). If there is no DHCPOFFER message to process, the denial of the specified DHCP server is complete. Other unauthorized DHCP servers may have to be denied. The invalid server denial handler loops to step 401 to retrieve the next unauthorized DHCP server to process.

If, as determined at step 407 there is a DHCPOFFER message to process in response to the DHCPDISCOVER message sent to the DHCP server, and as illustrated at step 408, invalid server denial handler 208 sends a DHCPREQUEST message to the DHCP server. This DHCPREQUEST message is unicast to the specified DHCP server in order to accept the IP address proposed in the DHCPOFFER. The DHCPREQUEST is constructed in accordance with the DHCP protocol, using the information retrieved form the DHCPOFFER message. When the DHCP server receives the DHCPREQUEST message, it definitively reserves the proposed IP address, and this IP address cannot be allocated to another DHCP client. Invalid server denial handler then loops back to step 406 and waits for another message.

It should be noted that the step of flooding each unauthorized DHCP server with multiple IP address renewal requests and the step of reserving as many IP addresses as possible in each unauthorized DHCP server can be implemented together in a single embodiment as described above or independently in distinct embodiments.

ADVANTAGES

The present inventions provides the following advantages.

Unauthorized DHCP servers are detected, and can for example be physically removed from the IP network by a network administrator.

The negative effects generated by unauthorized DHCP servers within the IP network are limited. In particular, the number of DHCP clients receiving configuration information from the unauthorized DHCP servers is minimized. When the configuration information is in error, the number of DHCP clients in error is therefore minimized.

The traffic required within the IP network for detecting and neutralizing unauthorized DHCP servers is minimized. In particular, no broadcast message is utilized (only unicast messages are utilized) for the denial of unauthorized DHCP servers. Because each device within the IP network has to read broadcast messages, the broadcast messages have usually a negative impact on the performance of the devices. For example, a DHCP client has to read each broadcast message, just to determine that it does not have to answer it. Since no broadcast message is utilized for neutralizing unauthorized DHCP servers, the impact on the performance of each device attached to the IP network is therefore minimized.

The quality of the DHCP Service is improved because the impact within the IP network of the unauthorized DHCP servers is limited. The number DHCP clients configured with information in error is limited. Consequently, the number of access problems within the IP network is also limited.

The security within the IP network is improved. Since the number of DHCP clients in error is minimized, the risk of having DHCP clients configured with information in error allowing access to confidential information is limited.

No additional or specific hardware is required.

While the invention has been particularly shown and described with reference to a preferred embodiment, it will be understood that various changes in form and detail may be made therein without departing from the spirit, and scope of the invention.

What is claimed is:

1. A method for preventing unauthorized dynamic host configuration servers from responding to client configuration requests in an Internet Protocol (IP) network, said method comprising the steps of:
    broadcasting host configuration requests from a server checker client;
    receiving configuration offer messages from one or more dynamic host configuration servers, said configuration offer messages delivered to the server checker client responsive to the broadcast host configuration requests;
    detecting an unauthorized dynamic host configuration server within said IP network in accordance with server identification data within the configuration offer messages; and
    responsive to said detecting step, unicasting host configuration requests from said server checker client to said unauthorized dynamic configuration server such that said unauthorized dynamic host configuration server is unable to respond to configuration requests from network clients.

2. The method of claim 1, said unicasting host configuration requests comprising unicasting a plurality of IP address renewal requests to said unauthorized dynamic host configuration server.

3. The method of claim 2 wherein each IP address renewal request includes:
    a client medium access control (MAC) address that is not included within a range of valid MAC addresses utilized within the IP network.

4. The method of claim 2, wherein each IP address renewal request includes a client IP address that is not included within a range of valid IP addressed utilized in the IP network.

5. The method of claim 1, wherein said checker client includes a server table having a list of authorized dynamic host configuration servers, and wherein said step of detecting an unauthorized dynamic host configuration server further comprises
    comparing a server identifier included in each configuration offer message with authorized server identification data in the server table.

6. The method of claim 5 wherein said comparing a server identifier included in each configuration offer message with authorized server identification data in the server table further comprises the retrieving an IP address from each configuration offer message.

7. The method of claim 5, wherein said server table includes an IP address for each authorized dynamic host configuration server.

8. A system for preventing unauthorized dynamic host configuration servers from responding to client configuration requests in an Internet Protocol (IP) network, said system comprising:
    processing means for broadcasting host configuration requests from a server checker client;
    processing means for receiving configuration offer messages from one or more dynamic host configuration servers, said configuration offer messages delivered to the server checker client responsive to the broadcast host configuration requests;
    processing means for detecting an unauthorized dynamic host configuration server within said IP network in accordance with server identification data within the configuration offer messages; and
    processing means, responsive to detecting an unauthorized dynamic host configuration server, for unicasting host configuration requests from said server checker client to said unauthorized dynamic configuration server such that said unauthorized dynamic host configuration server is unable to respond to configuration requests from network clients.

9. The system of claim 8, said processing means for unicasting host configuration requests comprising processing means for unicasting a plurality of IP address renewal requests to said unauthorized dynamic host configuration server.

10. The system of claim 9 wherein each IP address renewal request includes:
    a client medium access control (MAC) address that is not included within a range of valid MAC addresses utilized within the IP networks.

11. The system of claim 9, wherein each IP address renewal request includes a client IP address that is not included within a range of valid IP addressed utilized in the IP network.

12. The system of claim 8, wherein said checker client includes a server table having a list of authorized dynamic host configuration servers, and wherein said processing means for detecting an unauthorized dynamic host configuration server further comprises
    processing means for comparing a server identifier included in each configuration offer message with authorized server identification data in the server table.

13. The system of claim 12, wherein said processing means for comparing a server identifier included in each configuration offer message with authorized server identification data in the server table further comprises processing means for retrieving an IP address from each configuration offer message.

14. The system of claim 12, wherein said server table includes an IP address for each authorized dynamic host configuration server.

15. A program product for preventing unauthorized dynamic host configuration servers from responding to client configuration requests in an Internet Protocol (IP) network, said program product comprising:
    instruction means for broadcasting host configuration requests from a server checker client;
    instruction means for processing configuration offer messages received from one or more dynamic host configuration servers, said configuration offer messages delivered to the server checker client responsive to the broadcast host configuration requests;

instruction means for detecting an unauthorized dynamic host configuration server within said IP network in accordance with server identification data within the configuration offer messages; and instruction means, responsive to said detecting, for unicasting host configuration requests for said server checker client to said unauthorized dynamic configuration server such that said unauthorized dynamic host configuration server is unable to respond to configuration requests from network clients.

16. The program product of claim 15, said instruction means for unicasting host configuration requests comprising instruction means for unicasting a plurality of IP address renewal requests.

17. The program product of claim 16, wherein each IP address renewal request includes:

a client medium access control (MAC) address that is not included within a range of valid MAC addresses utilized within the IP networks.

18. The program product of claim 16 wherein each IP address renewal request includes a client IP address that is not included within a range of valid IP addressed utilized in the IP network.

19. The program product of claim 15 wherein said checker client includes a server table having a list of authorized dynamic host configuration servers, and wherein said instruction means for detecting an unauthorized dynamic host configuration server further comprises:

comparing a server identifier included in each configuration offer message with authorized server identification data in the server table.

20. The program product of claim 19, wherein said instruction means for comparing a server identifier included in each configuration offer message with authorized server identification data in the server table further comprises instructions means for retrieving an IP address from each configuration offer message.

21. The program product of claim 19 wherein said server table includes an IP address for each authorized dynamic host configuration server.

* * * * *